United States Patent

Alwitt et al.

[15] 3,697,822

[45] Oct. 10, 1972

[54] ELECTROLYTIC CAPACITOR HAVING AN ELECTRODE WITH A METALLIZED CRACKED OXIDE SURFACE

[72] Inventors: Robert S. Alwitt, Williamstown, Mass.; Robert W. Santway, Bennington, Vt.

[73] Assignee: Sprague Electric Company, North Adams, Mass.

[22] Filed: July 21, 1971

[21] Appl. No.: 164,792

[52] U.S. Cl. ............................ 317/230, 29/570
[51] Int. Cl. ................................................ H01g 9/04
[58] Field of Search ......... 317/230, 231, 233; 29/570

[56] References Cited

UNITED STATES PATENTS

| 2,085,413 | 6/1937 | Bloomenthal | 317/230 |
| 2,636,062 | 4/1953 | Calton | 317/230 |
| 3,082,360 | 3/1963 | Robinson et al. | 317/230 |
| 2,368,688 | 2/1945 | Taylor | 317/230 |

*Primary Examiner*—James D. Kallam
*Attorney*—Vincent H. Sweeney et al.

[57] ABSTRACT

An aluminum surface is treated with hot water to produce a hydrous aluminum oxide film. The film is then heated treated so as to crack the oxide film. A thin film of aluminum is then deposited over this skeletal structure, and the resulting thin film contacts the original aluminum surface through the cracks in the oxide film. A high surface area electrode that is economical to manufacture is obtained in this fashion.

19 Claims, 3 Drawing Figures

ELECTROLYTIC CAPACITOR HAVING AN ELECTRODE WITH A METALLIZED CRACKED OXIDE SURFACE

BACKGROUND OF THE INVENTION

This invention relates to a cracked oxide electrode for electrolytic capacitors, and more particularly to a high surface area electrode for electrolytic capacitors and an economical method of producing the same.

It is well known in the electrolytic capacitor art to increase by various types of etching operations the surface area of foil, such as aluminum, to be employed for either or both anode and cathode electrodes. The increase in effective surface area of aluminum so treated is largely due to the uneven penetration of the etch process. However, this results in the mechanical weakening of the metal and is particularly undesirable in aluminum foil as there is a tendency for the foil to become perforated. The foil used therein must of necessity be rather thick to compensate for this problem.

Accordingly, it is an object of the present invention to provide an electrode of high surface area without having to actually etch the foil used therefor.

It is another object of the present invention to permit the use of extremely thin foils as the basis for producing electrodes for electrolytic capacitors.

It is still another object of this invention to provide an economical means of increasing the surface area of electrolytic capacitor electrodes.

SUMMARY OF THE INVENTION

An aluminum foil surface is treated with hot water to produce a hydrous aluminum oxide film thereon that has a high surface area. This film and foil is then briefly exposed to a relatively high temperature in order to crack the film. A thin film of aluminum is then deposited over this "skeletal" structure. This structure is such that the thin film thereon is allowed to contact the original aluminum substrate through the cracks in the oxide film. A high surface area electrode is economically manufactured in this fashion. The surface of the foil is not etched as such, but rather the hydrous oxide film formed thereon is "cracked," and since the interior of the substrate does not contribute to the surface area increase, the substrate can advantageously be of any thickness desired, for example, a very thin foil or a deposited film.

DESCRIPTION OF THE PREFERRED EMBODIMENT

Capacitance, by definition, is equal to KA/D, where K is the dielectric constant of the dielectric material, A is the surface area of the electrode material, and D is the thickness or distance between the two plates of the capacitor. With an increase in the formation voltage, D also increases, thereby reducing the effective capacitance. This difficulty is overcome by increasing the surface area of the electrodes in some manner. This is usually accomplished by etching the plates. However, etching can present problems with thin foils. The present invention effectively increases the surface area of the electrode material without using an etching operation. The total capacitance of these units is directly related to the surface areas of the electrodes, and can be computed by the formula $1/C = 1/C_A + 1/C_C$, where $C_A$ is the anode capacitance, $C_C$ is the cathode capacitance, and $C$ is the total capacitance. Therefore, since the cathode capacitance is in inverse series with the anode capacitance, the total capacitance is reduced unless the cathode capacitance is greater than the anode capacitance, and one way of achieving this is to increase the surface area of the cathode.

Figure 1:
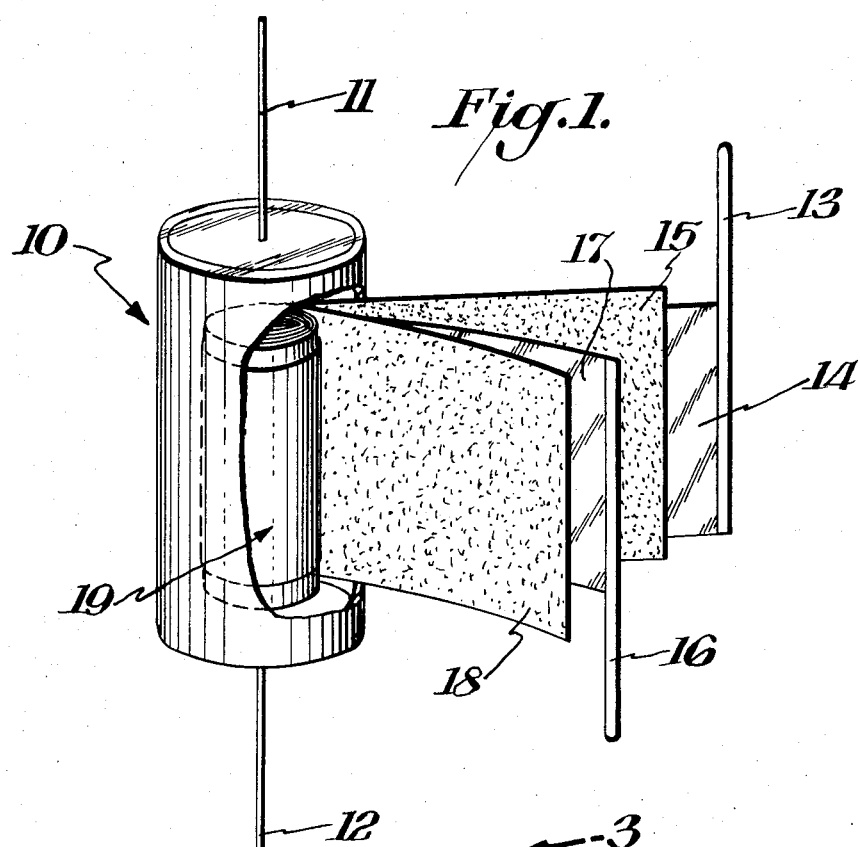
FIG. 1 is an exposed view of an electrolytic capacitor utilizing a high surface electrode of this invention.

An electrolytic capacitor, such as shown in FIG. 1, uses foil electrodes therein. The foil electrodes can have their surface area increased advantageously and economically by forming a "cracked oxide" skeletal structure on a foil substrate, and then metallizing this skeletal structure in such a manner as to contact this metal to the foil substrate through the "cracks" in the oxide layer. This can be best described by reference to the drawing.

FIG. 1 shows an electrolytic capacitor 10 of this invention having terminal leads 11 and 12 thereon, and containing a foil-spacer-foil system rolled into a cylinder 19 and impregnated with an electrolyte. The rolled cylinder 19 is composed of a cathode foil 14 having a metal terminal tab 13 thereon, an interleaving paper spacer 15, a formed anode foil 17 having a metal terminal tab 16 thereon, and another paper spacer 18. The anode foil 17 may advantageously be electrochemically formed by a method known to one skilled in the art. The spacer material absorbs the electrolyte, allowing it to maintain uniform and intimate contact with all of the surface eccentricities of the cathode foil 14 and the anode foil 17. The cathode foil 14 serves as an electrical connection to the electrolyte. The spacer material may advantageously be of any material commonly used as such in the capacitor art. The anode foil 17 may advantageously be any valve metal known to one skilled in the art.

It has been found that the surface area of an aluminum foil of any thickness can advantageously be increased by following the process prescribed herein. The surface of an aluminum foil is reacted with boiling water for from 1 to 30 minutes, so as to form a hydrous oxide film thereon, having a thickness of between $2 \times 10^{-5}$ cm and $6 \times 10^{-5}$ cm. This foil, so treated, is then briefly exposed to an elevated temperature in order to "crack" the film. A temperature of approximately 450° C for about 15 minutes is sufficient to crack the hydrous oxide film just described.

Figure 2:
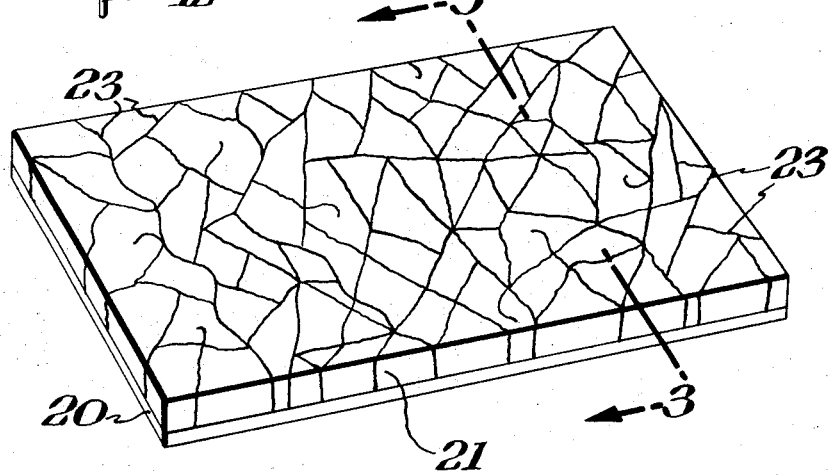
FIG. 2 is a perspective view of a foil having a cracked oxide film thereon.
Figure 3:
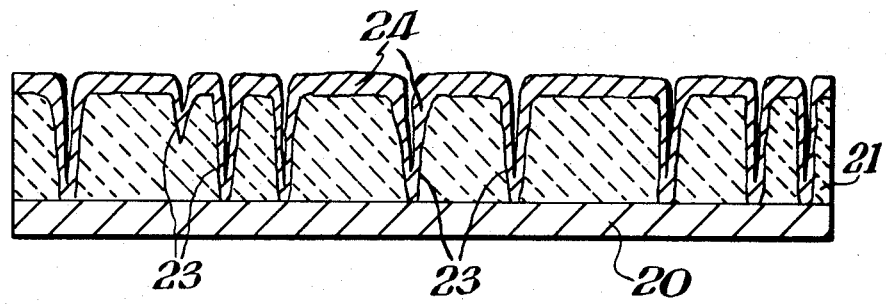
FIG. 3 is a cross-section of FIG. 2 along line 3—3, also showing an additional metallization thereon.

FIG. 2 illustrates such a cracked oxide film wherein an aluminum foil substrate 20 has formed thereon a hydrous aluminum oxide film 21, said film 21 has a random network of cracks 23 formed by heating. Openings in the cracked oxide layer extend downward all the way to the foil substrate 20. A metal layer can then be deposited on the cracked oxide layer in such a manner that the deposited metal layer comes into contact with the aluminum substrate, as shown in FIG. 3. In that FIGURE, an aluminum foil substrate 20 having a cracked aluminum oxide film 21 formed thereon, also has a metal film 24 deposited thereon in a manner that allows the metal layer 24 to come in direct contact with the aluminum foil substrate 20. Since the interior of the substrate 20 does not itself contribute to the surface area increase, the substrate can be of any thickness, for example, a very thin foil or a deposited film.

While it is described herein that heating the hydrous oxide film for around 15 minutes at 450° C is preferred for causing a cracking thereof, it should be noted that the hydrous oxide film could be exposed to a temperature of up to just below the melting point of the foil metal. The heating time is not critical, and need only be sufficient to cause a network of cracks to form on the oxide. No deleterious effects are encountered from overexposure to these temperatures.

Aluminum may be advantageously deposited on the cracked skeletal structure by vacuum deposition, or by any non-interfering method of depositing metals known to one skilled in the art. Other conductive metals may be deposited alternatively with advantageous results, provided these metals do not render the unit too corrosive, and satisfactorily serve as a cathode. Tantalum is a good example of such an alternative to aluminum as the material for the metallizing layer. This metal layer should range in thickness from 500 A to 10,000 A.

The electrode formed by this invention may be advantageously used as a cathode foil, the aluminum substrate thickness being ½ mil or ¼ mil or less, and will have a capacity of 200—250 $\mu fd/in^2$. This compares with 150 $\mu fd/in^2$ in a commercially available 1 mil etched aluminum cathode. Alternatively, the electrode produced herein can be further treated, as by anodization techniques known to one skilled in the art, and used as a high surface area anode foil. A commonly used anodization technique would be to anodize the treated aluminum foil in a solution of ammonium dihydrogen phosphate (1 gm/liter at 90° C).

The above-described specific embodiments of the invention have been set forth for the purposes of illustration. It will be apparent to those skilled in the art that various modifications may be made in the composition of the electrode without departing from the principles of this invention as pointed out and disclosed herein. For that reason, it is not intended that the invention should be limited other than by the scope of the appended claims.

What is claimed is:

1. An electrolytic capacitor comprising a formed valve metal anode electrode, a cathode contact electrode spaced from said anode electrode, and an electrolyte in contact with said electrodes; at least one of said electrodes comprising an aluminum substrate having a cracked oxide film thereon, and an outer metallized layer of at least one metal taken from the group consisting of aluminum and tantalum in direct contact with said aluminum substrate through said cracked oxide film.

2. The electrolytic capacitor of claim 1 wherein said metallized layer is aluminum.

3. The electrolytic capacitor of claim 1 wherein said at least one electrode is said cathode electrode.

4. The electrolytic capacitor of claim 3 wherein said formed anode electrode includes an aluminum substrate having a cracked oxide film thereon, an outer metallized layer of at least one metal taken from the group consisting of aluminum and tantalum in direct contact with said aluminum substrate, and an anodized layer formed thereon.

5. The electrolytic capacitor of claim 4 wherein said metallized layer is aluminum.

6. An electrode for an electrolytic capacitor comprising an aluminum substrate having a cracked oxide film thereon, and an outer metallized layer of at least one metal taken from the group consisting of aluminum and tantalum in direct contact with said aluminum substrate through said cracked oxide film.

7. The electrode of claim 6 wherein said outer metallized layer has an anodized layer formed thereon.

8. The electrode of claim 6 wherein said metallized layer is aluminum.

9. A process for making an electrode for an electrolytic capacitor comprising:
   a. reacting a surface of an aluminum substrate with hot water so as to produce a hydrous oxide film thereon;
   b. heating said hydrous oxide film at a temperature of between 400°–650° C so as to crack said oxide film;
   c. depositing a film of at least one metal selected from the group consisting of aluminum and tantalum on said cracked oxide film so as to directly contact said aluminum substrate through said cracked oxide film; said metal film ranging in thickness from 500 A to 10,000 A.

10. The process of claim 9 wherein said deposited metal film is anodized.

11. The process of claim 10 wherein said hydrous oxide film is heated at 450° C, and said deposited metal film is aluminum.

12. The process of claim 9 wherein said hydrous oxide film is heated at 450° C; and said deposited metal film is aluminum.

13. The process of claim 12 wherein said metal film is deposited by vacuum deposition.

14. A process for making an electrolytic capacitor comprising:
   a. providing a formed valve metal anode electrode and a cathode contact electrode;
   b. reacting a surface of an aluminum substrate of at least one of said electrodes with hot water so as to produce a hydrous oxide film thereon;
   c. heating said hydrous oxide film at a temperature of between 400°–650° C so as to crack said oxide film;
   d. depositing a film of at least one metal selected from the group consisting of aluminum and tantalum on said cracked oxide film so as to directly contact said aluminum substrate through said cracked oxide film, and said metal film ranging in thickness from 500 A to 10,000 A, thereby increasing the surface area thereof for at least one of said electrodes;
   e. assembling said at least one electrode and the other electrode spaced from each other, and an electrolyte in contact with both of said electrodes.

15. The process of claim 14 wherein said at least one electrode is said cathode electrode.

16. The process of claim 15 wherein said hydrous oxide film is heated at 450° C, and said deposited metal film is aluminum.

17. The process of claim 14 wherein said deposited metal is anodized.

18. The process of claim 14 wherein said hydrous oxide film is heated at 450° C; and said deposited metal film is aluminum.

19. The process of claim 18 wherein said metal film is deposited by vacuum deposition.

* * * * *